United States Patent
Zhang et al.

(10) Patent No.: US 8,373,763 B2
(45) Date of Patent: Feb. 12, 2013

(54) SELF CALIBRATION OF EXTRINSIC CAMERA PARAMETERS FOR A VEHICLE CAMERA

(75) Inventors: Wende Zhang, Shelby Township, MI (US); Mark J. Wolski, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1301 days.

(21) Appl. No.: 12/125,471

(22) Filed: May 22, 2008

(65) Prior Publication Data

US 2009/0290032 A1 Nov. 26, 2009

(51) Int. Cl.
*H04N 5/232* (2006.01)
*H04N 5/225* (2006.01)
*H04N 17/00* (2006.01)

(52) U.S. Cl. .................. 348/211.9; 348/207.99; 348/176

(58) Field of Classification Search .................. 348/148, 348/187, 118, 119, 175, 176, 180, 207.99, 348/211.9; 340/901, 933, 937, 938, 942, 340/988, 992, 995.25, 425.5
See application file for complete search history.

(56) References Cited

U.S. PATENT DOCUMENTS

| 6,535,114 | B1 * | 3/2003 | Suzuki et al. ................. 340/435 |
| 2005/0225723 | A1 | 10/2005 | Pilu |
| 2008/0007619 | A1 * | 1/2008 | Shima et al. ................. 348/118 |

OTHER PUBLICATIONS

Baker, S. and Matthews, I., "Lucas-Kanade 20 Years On: A Unifying Framework", International Journal of Computer Vision 56(3), 2004, pp. 221-255.

Harris, C. and Stephens, M., "A Combined Corner and Edge Detector". Plessey Research Roke Manor, UK, The Plessey Co. plc., 1988 pp. 147-151.

* cited by examiner

*Primary Examiner* — Chieh M Fan
*Assistant Examiner* — Peter Chon
(74) *Attorney, Agent, or Firm* — John A. Miller; Miller IP Group, PLC (57) ABSTRACT

A system and method for calibrating a camera on a vehicle as the vehicle is being driven. The method includes identifying at least two feature points in at least two camera images from a vehicle that has moved between taking the images. The method then determines a camera translation direction between two camera positions. Following this, the method determines a ground plane in camera coordinates based on the corresponding feature points from the images and the camera translation direction. The method then determines a height of the camera above the ground and a rotation of the camera in vehicle coordinates.

20 Claims, 10 Drawing Sheets

SELF CALIBRATION OF EXTRINSIC CAMERA PARAMETERS FOR A VEHICLE CAMERA

BACKGROUND OF THE INVENTION

1. Field of the Invention

This invention relates generally to a system and method for calibrating a camera on a vehicle and, more particularly, to a system and method for automatically calibrating a camera on a vehicle that tracks points on the ground.

2. Discussion of the Related Art

Modern vehicles sometimes include one or more cameras that provide back-up assistance, take images of the vehicle driver to determining driver drowsiness or attentiveness, provide images of the road as the vehicle is traveling for collision avoidance purposes, provide structure recognition, such as roadway signs, etc. For those applications where graphics are overlaid on the camera images, it is critical to accurately calibrate the position and orientation of the camera with respect to the vehicle. Because of manufacturing tolerances, a separate end-of-line camera calibration, or aftermarket camera adjustment, must be performed on each vehicle for such things as accurate overlay of predicted vehicle path lines.

Some known camera systems do not provide camera calibration, but revert to a default value that may provide a couple of degrees of error. Other camera systems provide a precalibration approach where points on the camera image are hand-labeled and feature point locations are hand measured in the vehicle coordinates, such as by providing a checker board pattern of the image. However, these calibration techniques are typically time consuming and must be performed at a service location. Therefore, if the vehicle is traveling and hits a bump or some other obstacle in the road, the camera position could be altered, where the calibration would not be accurate until the vehicle was taken to the service location to be corrected.

Camera calibration involves determining a set of parameters that relate camera image coordinates to vehicle coordinates and vice versa. Some camera parameters, such as camera focal length, optical center, etc., are stable, while other parameters, such as camera orientation and position, are not. For example, the height of the camera depends on the load of the vehicle, which will change from time to time. This change can cause overlaid graphics of vehicle trajectory on the camera image to be inaccurate. Therefore, what is needed is a camera calibration process that automatically calibrates less stable camera parameters as the vehicle is being driven where the vehicle-camera system continually adapts itself over time.

SUMMARY OF THE INVENTION

In accordance with the teachings of the present invention, a system and method are disclosed for calibrating a camera on a vehicle as the vehicle is being driven. The method includes identifying at least two feature points in at least two camera images from a vehicle that has moved between taking the images. The method then determines a camera translation between two camera positions. Following this, the method determines a ground plane in camera coordinates based on corresponding features from the images and the camera translation direction. The method then determines a height of the camera above the ground and a rotation of the camera in vehicle coordinates.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for calibrating a camera on a vehicle as the vehicle is traveling is merely exemplary in nature, and is in no way intended to limit the invention or its applications or uses. For example, the present invention calibrates a camera on a vehicle. However, as will be appreciated by those skilled in the art, the camera calibration method of the invention may have application for calibrating other cameras that may not be on a vehicle.

Figure 1:
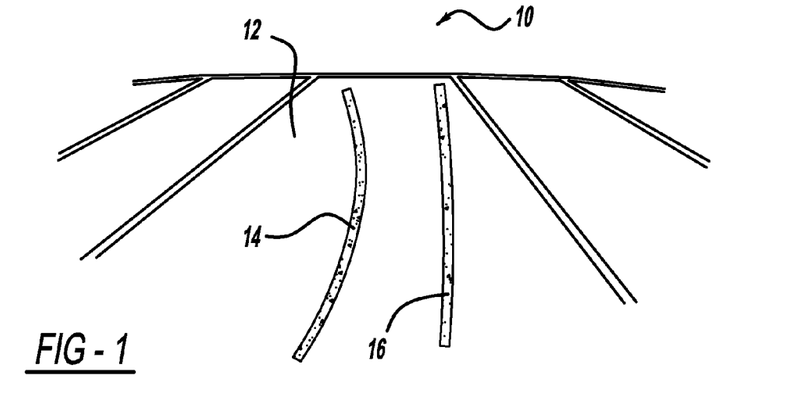
FIG. 1 is a camera image of the ground adjacent to a vehicle that includes overlay graphics.

As discussed above, for certain camera applications, the camera images generated by the camera are overlaid with graphics, such as a vehicle path or trajectory, to help the vehicle driver navigate the vehicle. FIG. 1 is a depiction of a camera image 10 of the ground behind a vehicle (not shown) where the vehicle is backing into a parking space 12. Overlay graphic lines 14 and 16 are shown on the camera image that would be displayed to the vehicle driver on a screen in the dashboard to show the driver the path that the vehicle needs to take to back into the parking space 12 properly.

As will be discussed in detail below, various techniques will be described for calibrating a camera depending on what information is available to determine the camera's height above the ground and the camera's orientation in vehicle coordinates. In a first case, the vehicle is traveling in a straight line, stationary points on the ground are tracked in successive video frames, and an odometer or vehicle velocity reading is provided to calculate the distance traveled by the vehicle between camera images. As will be discussed, for the first case, the algorithm determines the translation and rotation between camera coordinates for different positions of the camera, which are measured in the camera coordinates at the first position. The algorithm also determines the ground plane representation in the camera coordinates based on at least two points on the ground and the camera translation direction. The algorithm then identifies the camera's height above the ground and the camera rotation in the vehicle coordinates.

Figure 2A:
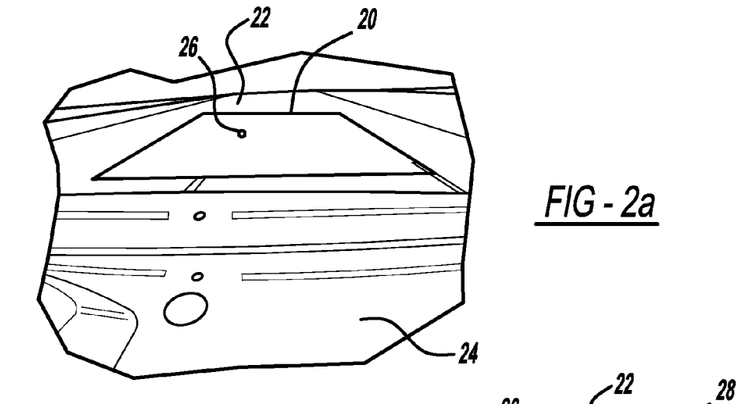
FIGS. 2(a) and 2(b) show illustrations of a camera image for two consecutive camera frames.
Figure 2B:
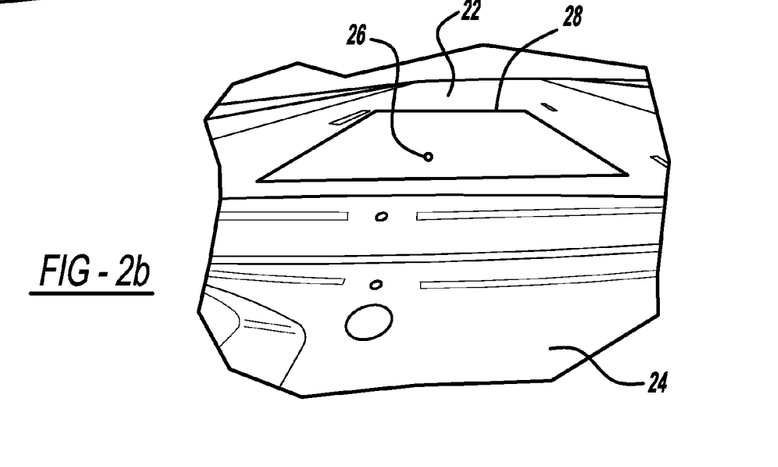

FIG. 2(a) illustrates a camera image 20 of a road 22 in front of a vehicle 24, where a feature point 26 is identified in the image 20. FIG. 2(b) is a next frame of a camera image 28 of the road 22, where the feature point 26 is now closer to the vehicle 24.

Figure 3:
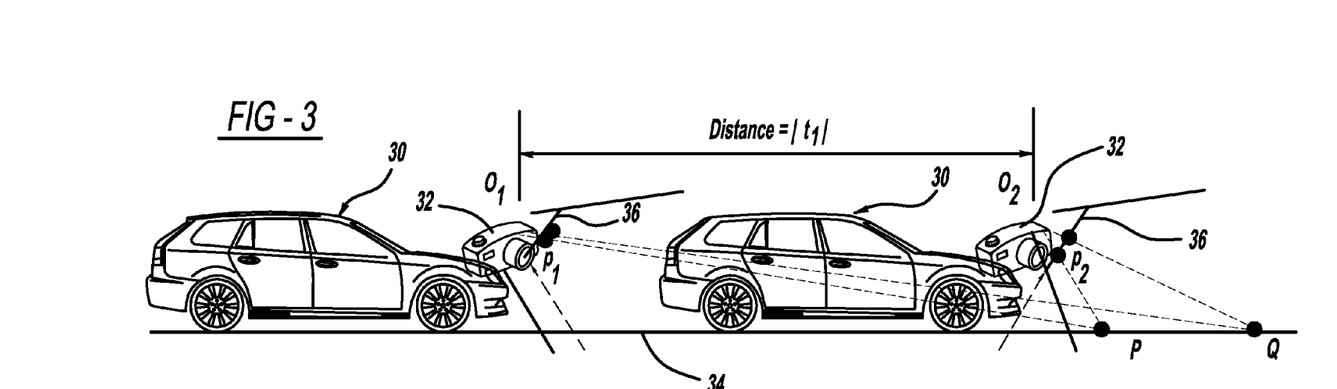
FIG. 3 is an illustration of a vehicle including a camera moving from one location to another location where points on the ground are used to calibrate the camera.

FIG. 3 is an illustration of a vehicle 30 traveling on the ground 34 and including a camera 32 taking images of the ground 34 as the vehicle travels. In this representation, the vehicle 30 travels from a first location to a second location a distance $t_1$ from each other. The center of the camera 32 at the first location is identified as point $O_1$ and the center of the camera 32 at the second location is identified as point $O_2$. Also illustrated are ground feature points P and Q and the projection positions $p_1$ and $p_2$ of the feature point P in a normalized image plane of the moving camera 32 identified by line 36.

While the vehicle 24 travels on the flat ground 34 in a straight line, the feature points P and Q are identified on the ground using, for example, a Harris corner detector around its driving path region in the camera image. As a result of this, there are the corresponding feature points P and Q in the next image frame that can be identified using a pyramid Lucas-Kanade optical flow estimation algorithm. For each tracked point (u, v) in the image, the feature points (e.g. P) are represented as $p=(x_n, y_n, 1)$ in each normalized image plane based on the given intrinsic camera parameters. Given two adjacent frames, the tracked corresponding feature points are represented as point pairs (e.g. $<p_1,p_2>$) in their corresponding normalized image planes 36. For each tracked point, such as P, the three points, namely the camera center $O_1$ at the first camera snapshot, the camera center $O_2$ at the second camera snapshot and the ground point P define a plane in three-dimensional space. Because $p_1$ is on the light-ray $O_1P$, and $p_2$ is on the light-ray $O_2P$, the five points $O_1, O_2, p_1, p_2$ and P are co-planar. Therefore:

$$O_1 p_1 \cdot [O_1 O_2 \times O_2 p_2] = 0 \qquad (1)$$

There is no rotation between the positions of the camera 32 when the vehicle 30 moves in a straight line. In the camera coordinates $<O_1>$, the rays $O_1p_1$ and $O_2p_2$ are represented by the vectors $p_1$ and $p_2$. The line $O_1O_2$ is represented by the point pair vehicle translation direction $t=[t_1, t_2, t_3]^T$. Using this notation, equation (1) can be rewritten as:

$$p_1 \cdot [t \times p_2] = 0 \qquad (2)$$

The only unknown of equation (2) is the translation direction t. Equation (2) can be rewritten in matrix format for each corresponding feature point pair $<p_1,p_2>$ as:

$$p_1^T [t]_x p_2 = 0, \qquad (3)$$

where $$[t]_x = \begin{bmatrix} 0 & -t_3 & t_2 \\ t_3 & 0 & -t_1 \\ -t_2 & t_1 & 0 \end{bmatrix},$$

$$p_1 = \begin{bmatrix} p_1 \\ p_2 \\ 1 \end{bmatrix}$$

and $$p_2 = \begin{bmatrix} p_1' \\ p_2' \\ 1 \end{bmatrix}$$

Equation (3) is a linear equation with respect to the unknown distances $t_1$, $t_2$ and $t_3$ where $(p'_2-p_2)t_1+(p_1-p_2')t_2+(p_2p_1'-p_1p_2)t_3=0$. The translation direction t can be determined from at least two point pairs $<p_1, p_2>$. Because the distance between the snapshots $|t_1|$ is given as the vehicle travel direction, the translation direction $t_1$ between the two snapshots is identified as $t_1=|t_1|t$.

If there are more than two pairs of corresponding camera points $<p_1, p_2>$ and $<q_1, q_2>$ the total least square estimation can be used with noise elimination to robustly estimate the translation direction t. The total least square estimation is used to estimate the translation direction t given all of the corresponding feature points. Given the estimated translation direction t, the outlier feature points evaluated by equation (2) are eliminated, which are outside of three times the standard deviation of all of the feature points. A robust translation direction t is estimated again from the remaining feature points using the total least square estimation.

Figure 4:
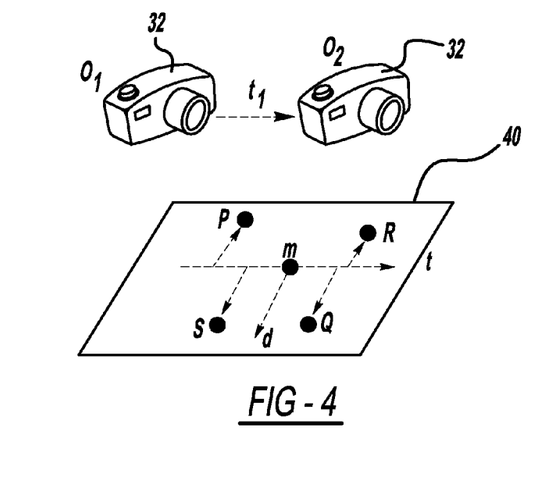
FIG. 4 is an illustration of a camera relative to the ground to determine the ground plane.

Once the algorithm has calculated the camera translation direction t, the algorithm then determines a ground plane representation in the camera coordinates based on the at least two points P and Q on the ground 34 and the camera translation direction t. FIG. 4 is an illustration of the camera 32 at locations $O_1$ and $O_2$ relative to a ground plane 40.

Because the translation direction vector t is known, the three-dimensional location of each point P in the camera coordinates $<O_1>$ can be calculated from the corresponding camera point pairs $<p_1, p_2>$ based on triangulation. Assuming that the vehicle height h does not change during the camera calibration, the camera translation direction t is parallel to the ground plane 40. Therefore, the reconstructed three-dimensional points on the ground 34 together with the camera translation direction t define the ground plane 40.

If there are more than two pairs of corresponding feature points on the ground 34, the mean m is calculated, and then all of the calculated three-dimensional points are projected to the null space of the translation direction t. Principal Component Analysis (PCA) can be used to find the dominant variation direction d of the ground feature points in the null space of the translation direction t. The direction d is the cross-product of the direction t and the ground plane norm n. The dominate variation direction d, the camera translation direction t and the feature point mean m define the ground plane 40 in the camera coordinates $<O_1>$.

In reality, not all of the tracked feature points P and Q will be on the ground 34. The above-ground feature points contribute to errors/noises. Therefore, the feature points that have a distance to the ground plane 40 greater than a threshold are eliminated. The final ground plane is estimated from the remaining feature points.

Figure 5:
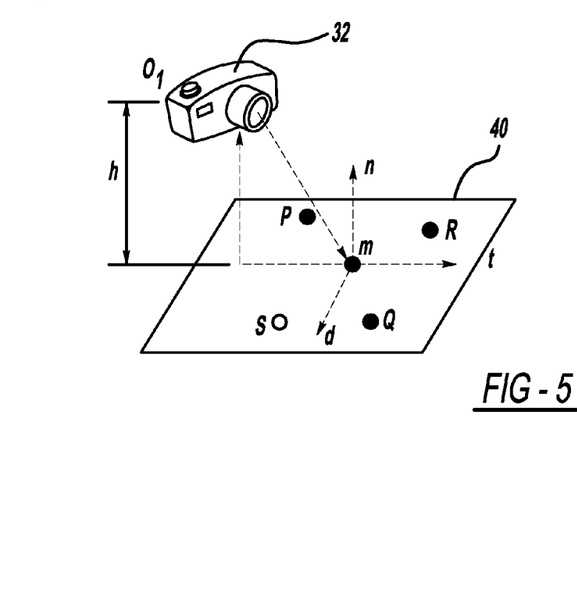
FIG. 5 is an illustration of a camera relative to the ground to determine the camera height above the ground.

Once the algorithm determines the ground plane 40 in the camera coordinates, the algorithm first eliminates those points that are not on the ground and then determines the camera height h above the ground 34. FIG. 5 is a representation of the camera 32 relative to the ground plane 40 showing the vectors and points for this calculation. The point S represents an outlier, which is above the estimated ground plane 34. To identify the camera height h above the ground plane 40, the norm n of the ground plane 40 is calculated as n=d×t. The height h of the camera above the ground plane 40 can be calculated as the inner product (h=<m, n>) between the feature point mean m and the ground plane norm n.

Figure 6:
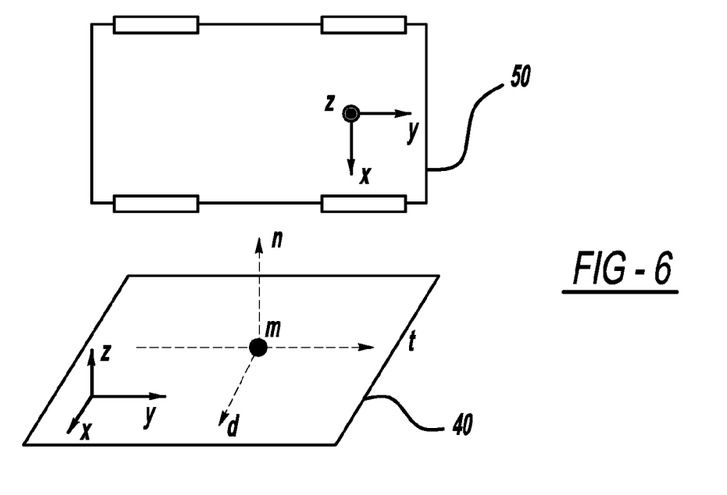
FIG. 6 is an illustration of a vehicle relative to the ground to determine vehicle coordinates.

Once the algorithm calculates the height h of the camera 32, the algorithm identifies the camera rotation in the vehicle coordinates. FIG. 6 is a representation of a vehicle 50 identifying the vehicle coordinate frame <x,y,z> relative to the ground plane 40. The origin to be centered between the rear wheels of the vehicle 50 on the ground 34 is defined. The x-axis is parallel to the vehicle bumpers, the y-axis is the vehicle backing direction without steering and the z-axis is the norm n of the ground plane 40.

Because the vehicle 50 moves in a straight line, the y-axis is parallel to the camera translation direction t. The x direction is the same as the direction d because both are orthogonal to the y-axis in the ground plane 40. The vehicle coordinates are thus defined as <d,t,n> in the camera coordinates <$O_1$>.

Figure 7:
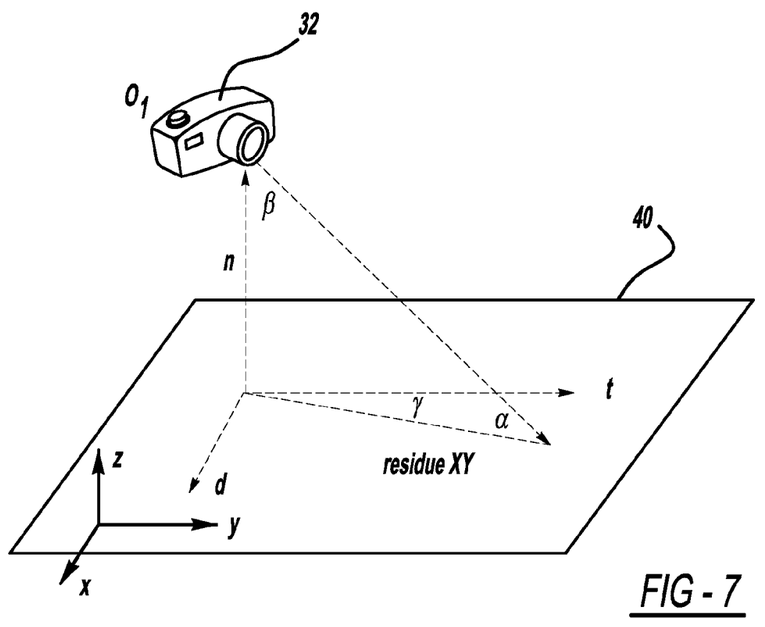
FIG. 7 is an illustration of a camera relative to the ground to determine camera rotation in vehicle coordinates.

FIG. 7 shows the camera 32 relative to the ground plane 40 that includes the variables for calculating the camera location in the vehicle coordinates, where α the pitch down of the camera 32 and γ is the yaw of the camera 32. The rotation matrix between the camera coordinates and the vehicle coordinates is given as:

$$R_{v \to c} = [d,t,n](p_{camera,1} = R_{v \to c} p_{vehicle} + t_{v \to c}) \quad (4)$$

Figure 8:
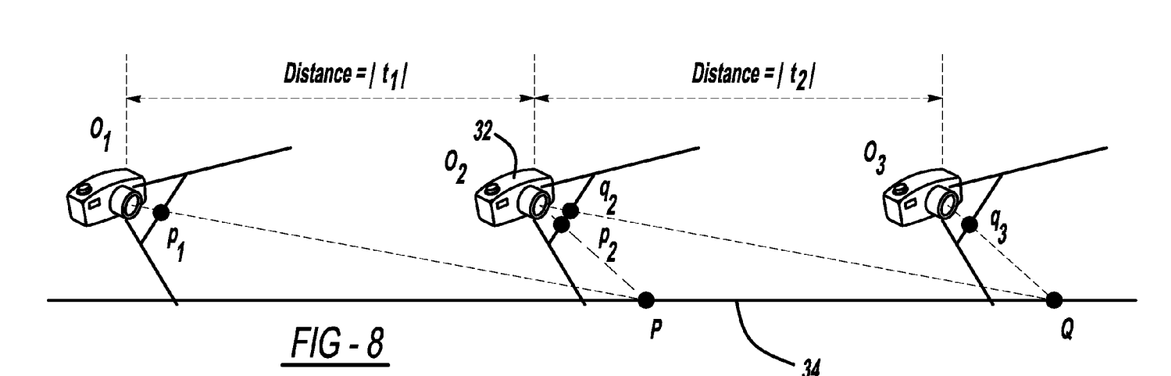
FIG. 8 is an illustration of a camera relative to the ground to determine calibration of the camera using two points.

The method for determining the camera orientation in the vehicle coordinates based on two camera snapshot frames discussed above can be extended to multiple frames of data to provide a more robust process for determining the camera height and rotation. FIG. 8 is an illustration of the camera 32 traveling along the ground 34 where images are taken at three camera locations $O_1$, $O_2$ and $O_3$, as shown. For point P on the ground 34, a plane in three-dimensional space can be defined by the camera locations $O_1$ and $O_2$ and the ground point P. The points $p_1$ and $p_2$ are the image projection points of the ground point P at the camera locations $O_1$ and $O_2$. Further, the camera locations $O_2$ and $O_3$ in combination with ground point Q can define a second plane in three-dimensional space. The points $q_2$ and $q_3$ are the image projection points of the ground point Q at camera locations $O_2$ and $O_3$. The translational direction distance |$t_1$| is the distance between points $O_1$ and $O_2$ and the translational direction distance |$t_2$| is the distance between points $O_2$ and $O_3$. If there are more than two snapshots, the estimation of the camera height h and rotation can be improved. In this case, at least one point in each pair of the neighboring camera positions needs to be tracked.

The camera center position $O_1$ at the first snapshot, the camera center position $O_2$ at the second snapshot and the ground point P define a plane in three-dimensional space. Because $p_1$ is on the light-ray $O_1P$ and $p_2$ is on the light-ray $O_2P$, the five points $O_1$, $O_2$, $p_1$, $p_2$ and P are co-planar. Similarly, the five points $O_2$, $O_3$, $q_2$, $q_3$ and Q are also co-planar.

Although the translation directions $t_1$ and $t_2$ between the adjacent snapshots are measured in two different camera coordinates and they have the same direction t in both coordinates because the vehicle is traveling in a straight line. Therefore:

$$O_1 p_1 \cdot [O_1 O_2 \times O_2 p_2] = 0 \Leftrightarrow p_1 \cdot [t \times p_2] = 0 \quad (5)$$

$$O_2 q_2 \cdot [O_2 O_3 \times O_3 q_3] = 0 \Leftrightarrow q_2 \cdot [t \times q_3] = 0 \quad (6)$$

The translation direction $t=[t_1, t_2, t_3]^T$ can be determined from equation (5) and equation (6) by at least two point pairs in total in any pair of the neighboring camera positions. Because the distance between the adjacent snapshots |$t_1$| and |$t_2$| is given as the vehicle travel distance, the translations $t_1=|t_1|t$ and $t_2=|t_2|t$. If there are more than two pairs of corresponding points, the total least square estimation can be used with noise elimination to estimate a robust translation direction t.

Figure 9:
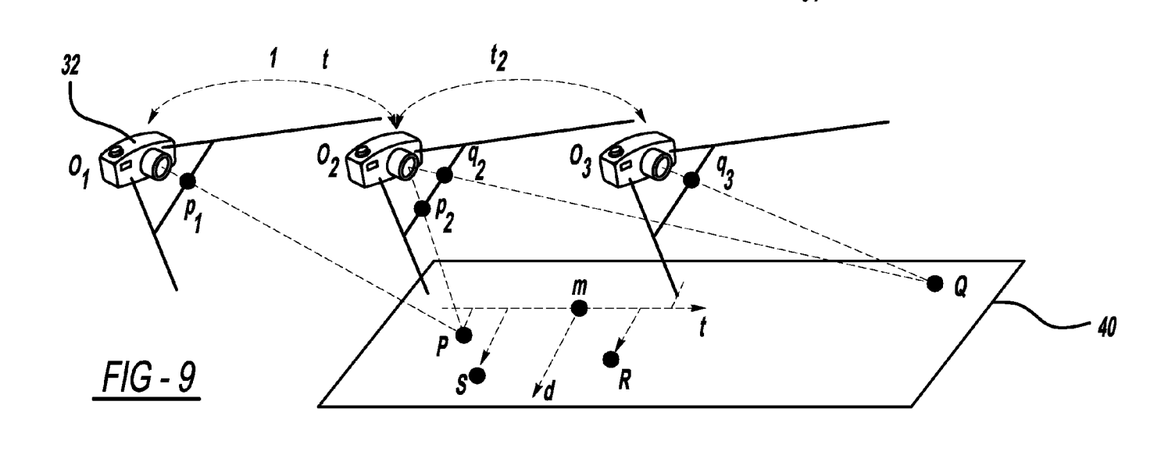
FIG. 9 is an illustration of cameras at different locations relative to the ground to determine the ground plane without vehicle travel distance.
Figure 10:
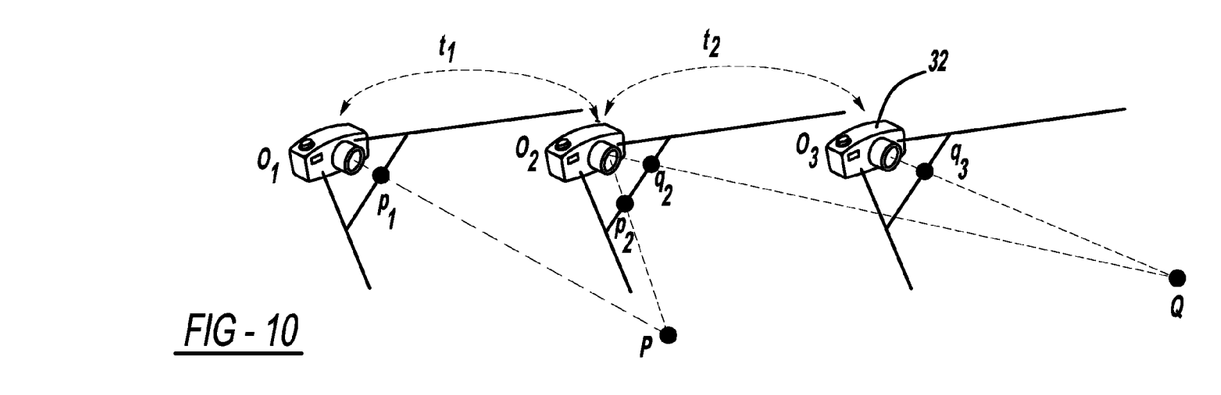
FIG. 10 is an illustration for defining the ground plane with multiple camera snapshots showing three-dimensional points in the camera coordinates $<O_1>$ and $<O_2>$.
Figure 11:
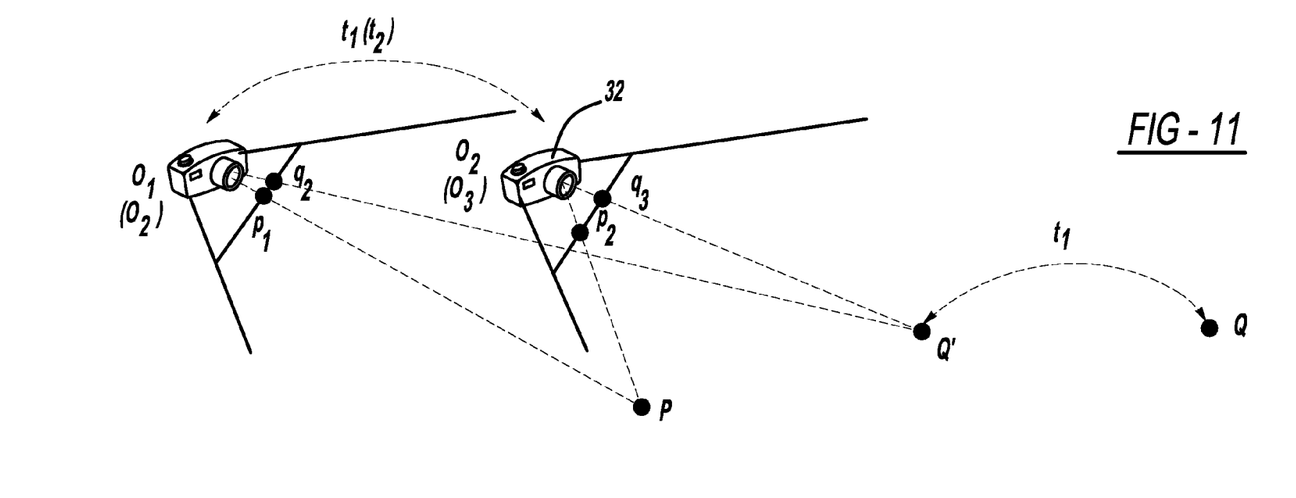
FIG. 11 is an illustration for defining the ground plane with multiple camera snapshots showing three-dimensional points in the camera coordinates $<O_1>$.

In this embodiment, the algorithm determines the ground plane representation in the camera coordinates based on at least two points on the ground 34 and the camera translation direction t using both of the camera coordinates. FIG. 9 is an illustration similar to FIG. 4 showing the camera 32 at three locations to provide this calculation for determining the ground plane. When there are more than two camera positions, three-dimensional point positions can be reconstructed in the same manner as discussed above by considering only two camera positions for any given point. In this case, the three-dimensional position can be constructed with respect to any one of the camera coordinates <$O_1$> or <$O_2$>. Because the translations between camera positions are known, the coordinates can be easily translated to the reference frame. Alternatively, the reconstructed three-dimensional position Q' with respect to the camera coordinates <$O_1$> differs from the three-dimensional point Q only by a known translation parallel to the ground. To speed up the processing, the point Q' can be used on the ground 34 instead of the point Q for the ground plane determination and continue the solution as discussed above. FIG. 10 is an illustration showing three-dimensional points in the camera coordinates <$O_1$> and <$O_2$> and FIG. 11 is an illustration showing three-dimensional points in the camera coordinates <$O_1$>.

The algorithm then calculates the camera height h above the ground, defines the vehicle coordinates and calculates the camera rotation in the vehicle coordinates in the same manner as the process discussed above with reference to FIGS. 5, 6 and 7.

According to another embodiment of the present invention for a second case, the camera 32 is calibrated without knowing the distance |t| traveled between the images used to provide the calibration. For example, vehicle speed measurements may not be provided for some reason. In this case, the camera rotation can only be estimated in the vehicle coordinates. As above, the translation direction t is calculated between the camera coordinates for different positions of the camera 32. These positions are measured in camera coordinates at the first position.

With more tracked feature points, points that are not on the ground plane 40 can be eliminated. By providing more than two camera locations, the distance d can be more accurately calculated to determine the location of the ground plane 40.

Although the distance traveled between the image snapshots is not known, the same method discussed above can be used to estimate the translation direction t in camera coordinates using equations (5) and (6), given the tracked points in the images.

Figure 12:
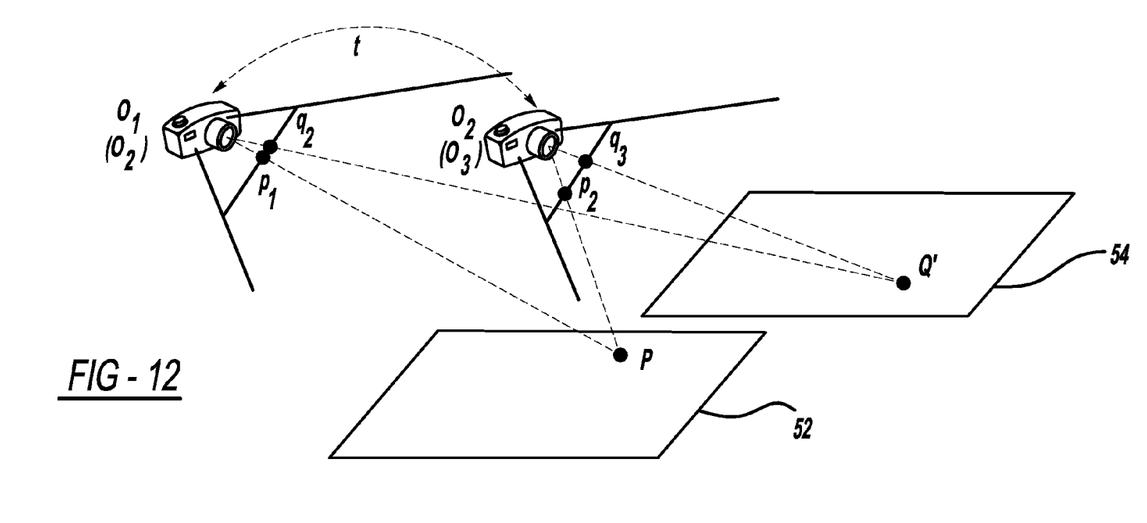
FIG. 12 is an illustration showing ground plane orientation identification with three-dimensional points in the camera coordinates.

The three-dimensional point positions are calculated in the same manner as discussed above by considering only two camera positions for any given point, but it is assumed that the unknown distances between adjacent camera positions are unit values. The translated reconstruction point Q' with respect to the camera coordinates is used to estimate the ground plane norm n. Due to scale ambiguity, the reconstructed point Q' is on the horizontal plane with a different depth than Q. In other words, the reconstructed three-dimensional point position is on a pseudo-ground plane, which has a different depth and the same plane norm as the ground plane, and is determined only up to a scale factor for each of the camera origin, as shown in FIG. 12.

Figure 13:
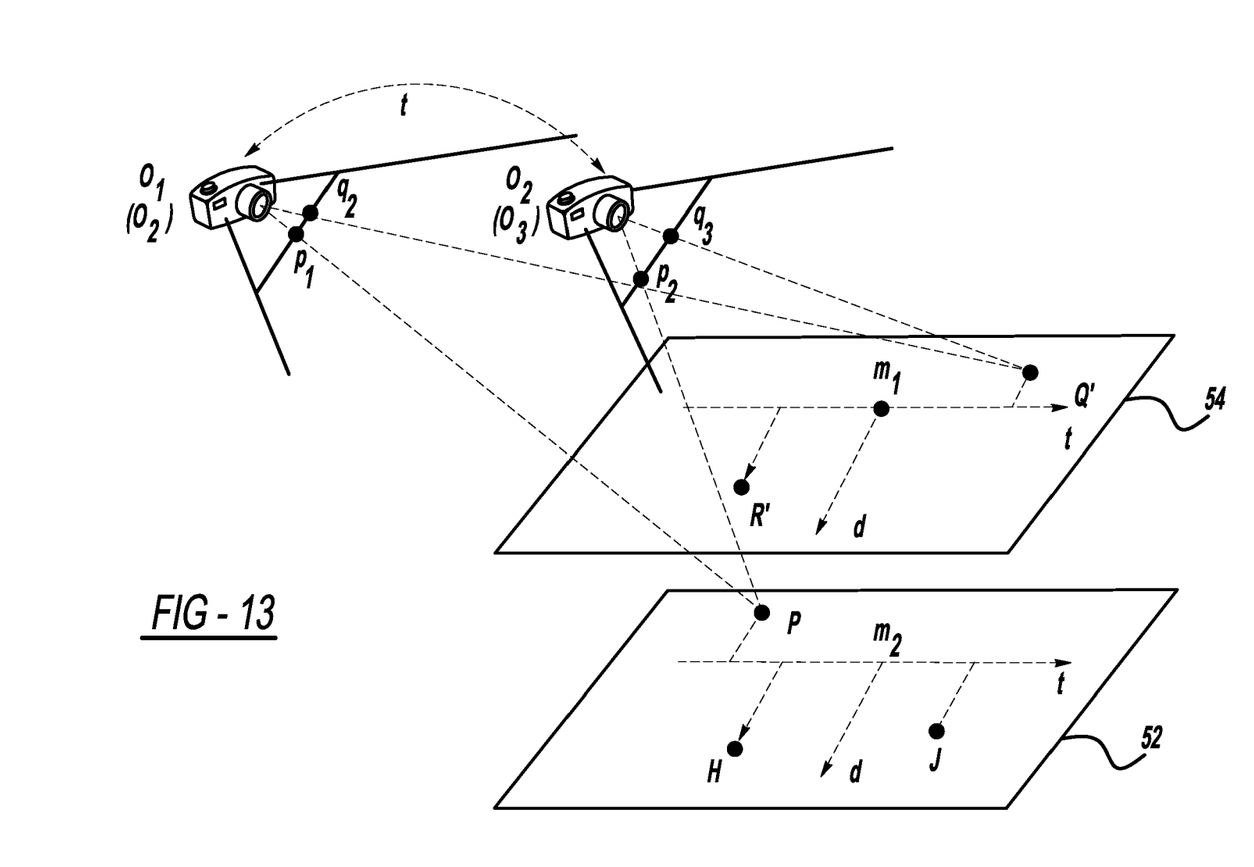
FIG. 13 is an illustration of ground plane orientation identification showing three-dimensional points in camera coordinates.
Figure 14:
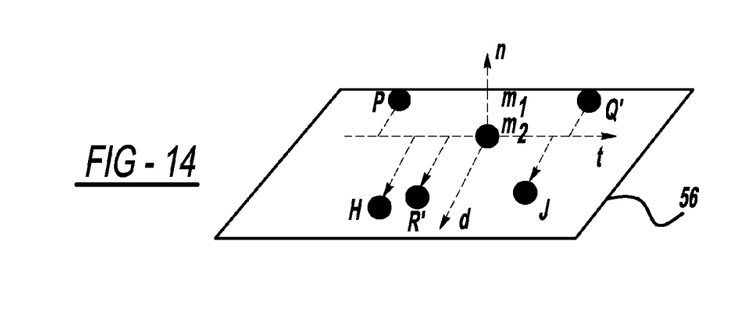
FIG. 14 is an illustration showing ground plane orientation identification and merged ground planes.

Unlike the discussion above for the first case, these calculations require at least two feature points for each camera pair, i.e., on each pseudo-ground plane, to estimate a robust ground norm n, as shown in FIG. 13. Once a collection of the pseudo-ground planes (e.g. ground$_1$ and ground$_2$) is obtained, the pseudo-ground planes can be merged vertically by subtracting their mean so that all of the points are on a common pseudo-ground plane, as illustrated in FIG. 14 showing the merged pseudo-ground plane 56. All of the points on the merged ground plane 56 are projected to the null space of the translation direction t. Principal component analysis can be used to the find the dominant variation direction d of the ground points in the null space of the translation direction t. Therefore, the norm n of the ground plane is n=d×t. Thus, the ground plane norm n is identified without knowing the distance between the cameras 32 when the images are taken. The rotation matrix between the camera coordinates and the vehicle coordinates is determined by equation (4).

The discussion above for calibrating the camera 32 requires the vehicle to be moving in a straight line. However, in some applications this may be too significant of a constraint where it may be necessary to calibrate the camera 32 when the vehicle steering angle is changing. The third case has to do with providing the camera calibration as the vehicle travels where the termination of the relationship between the points from the snapshots is taken for two different sections of the vehicle travel where it is straight. Because the vehicle is turning in the same plane, there is merely an in-plane rotational shift from one location to another, which can be taken out as if the turn did not occur.

Figure 15:
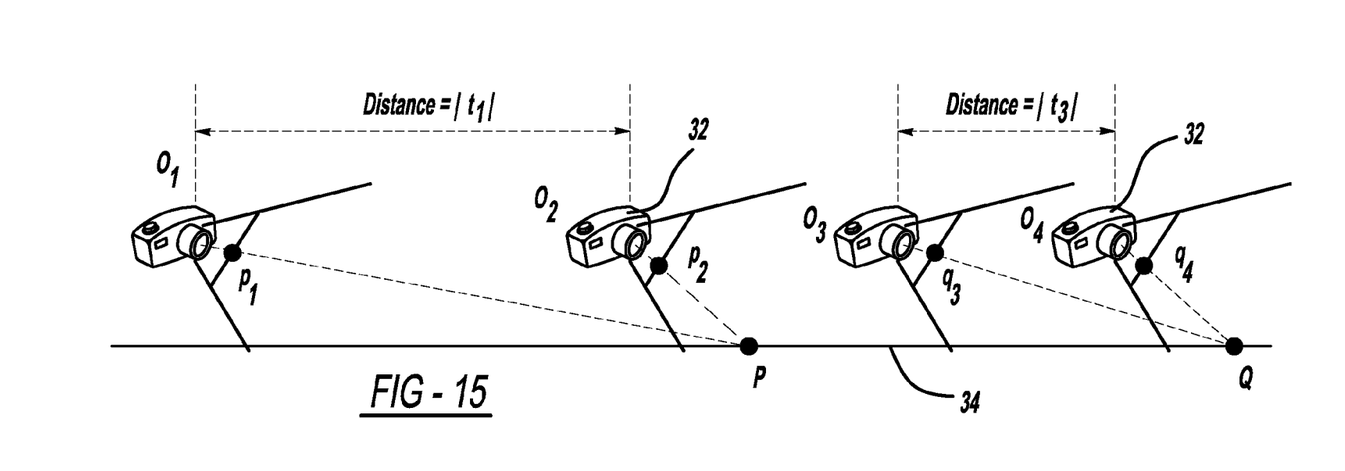
FIG. 15 is an illustration of cameras relative to the ground to determine camera calibration when the vehicle is turning.

FIG. 15 is an illustration of the camera 32 traveling along the ground 34 where snapshot images are taken at four locations $O_1$, $O_2$, $O_3$ and $O_4$. In this representation, the vehicle 10 is traveling straight between locations $O_1$ and $O_2$, is turning between locations $O_2$ and $O_3$, and is again traveling straight between locations $O_3$ and $O_4$. The translation direction t is determined from the plane $O_1$, $p_1$, $O_2$, $p_2$ and P and from the ground plane $O_3$, $q_2$, $O_4$, $q_4$ and Q in the same manner as discussed above as:

$$O_1 p_1 \cdot [O_1 O_2 \times O_2 p_2] = 0 \Leftrightarrow p_1 \cdot [t \times p_2] = 0 \quad (7)$$

$$O_2 q_2 \cdot [O_2 O_3 \times O_3 q_3] = 0 \Leftrightarrow q_2 \cdot [t \times q_3] = 0 \quad (8)$$

Figure 16:
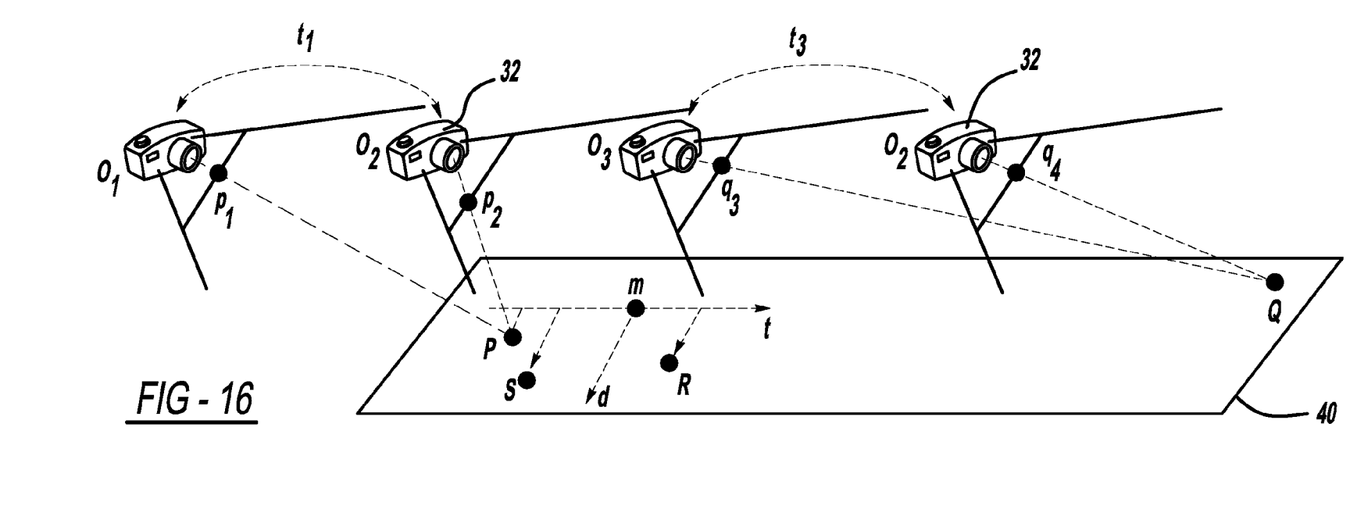
FIG. 16 is an illustration of cameras relative to the ground for determining the ground plane.

The location of the ground plane 40 is determined in the same manner as shown in FIG. 16. Likewise, the camera height h, the vehicle coordinates <x,y,z> and the camera rotation in the vehicle coordinates <x,y,z> are also calculated in the same manner as discussed above.

Figure 17:
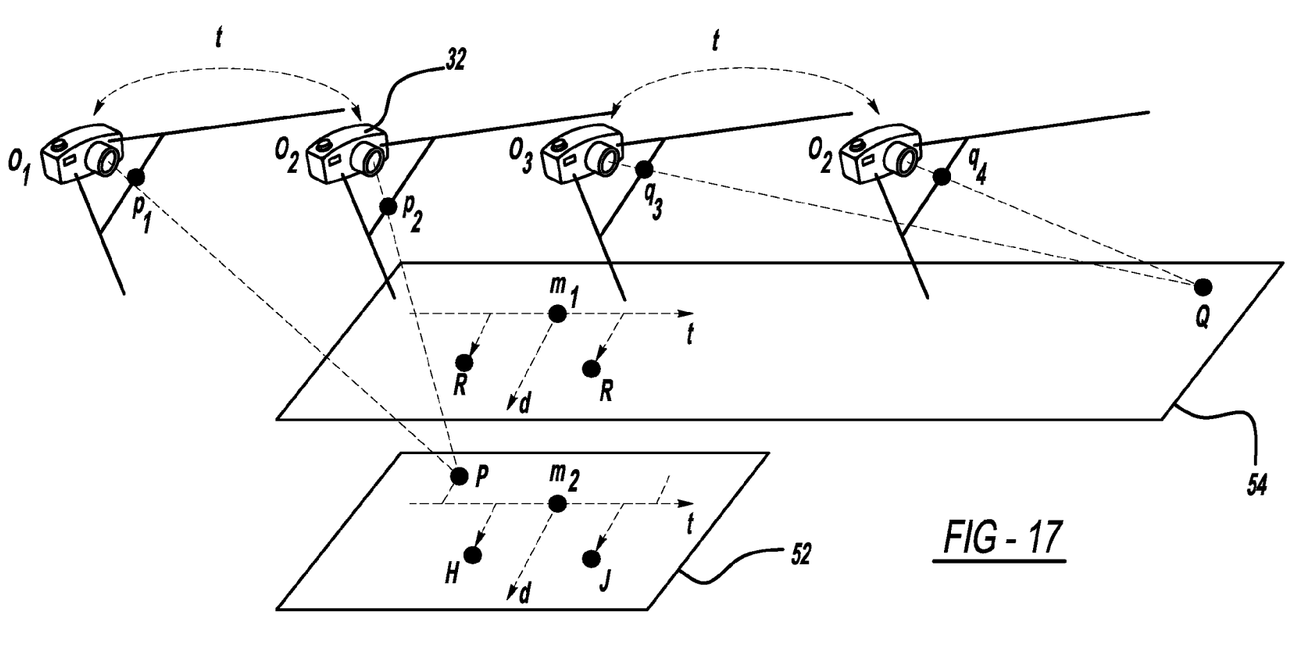
FIG. 17 is an illustration of cameras relative to two pseudo-ground planes for determining ground plane location.

Further, if the distance traveled between the locations $O_1$ and $O_2$ and $O_3$ and $O_4$ is not known and the vehicle is turning, then the determination of the ground plane norm n using the merged ground planes 52 and 54 can be performed in the same manner as discussed above, as shown in FIG. 17.

Figure 18:
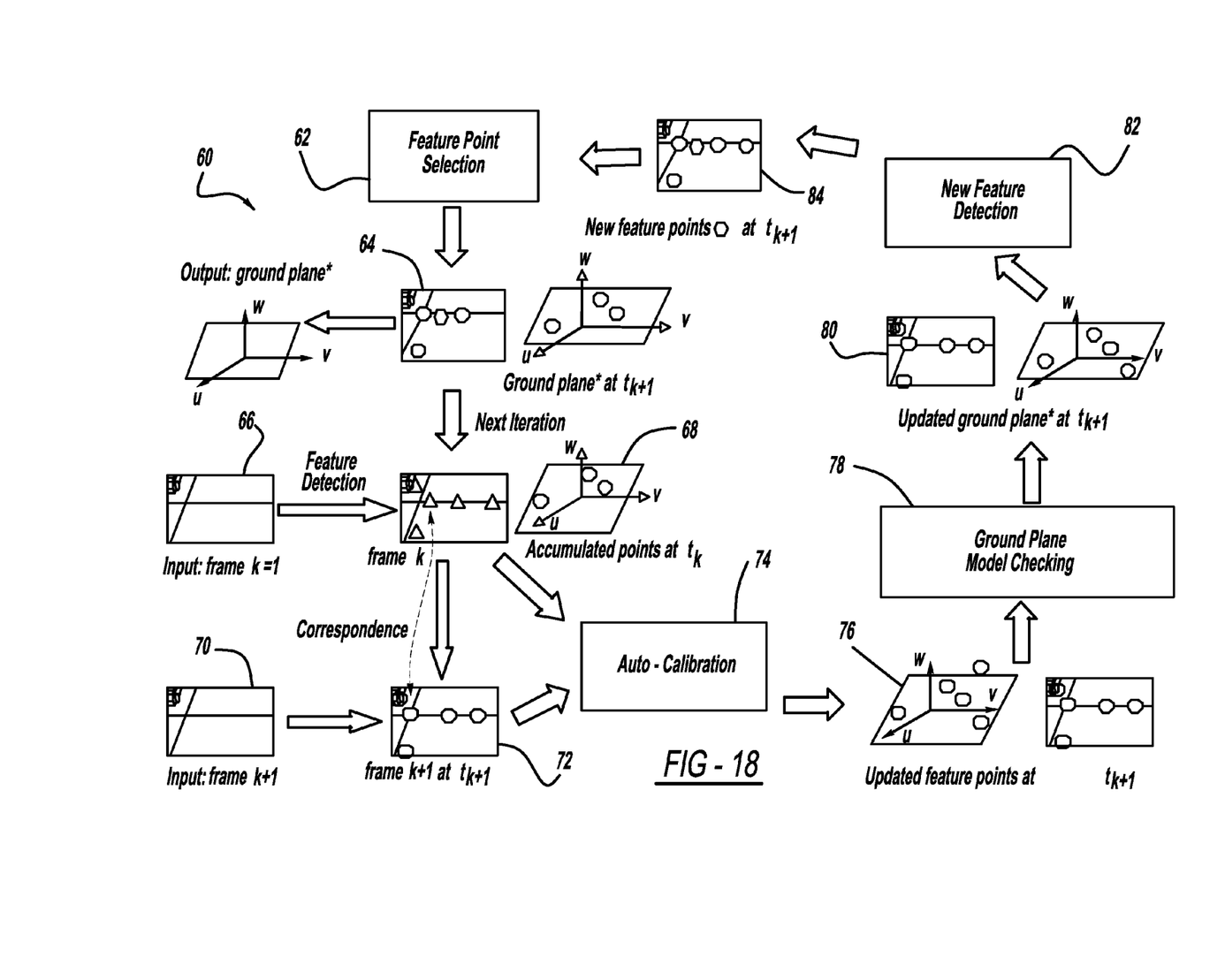
FIG. 18 is a flow chart diagram showing an auto-calibration process for calibrating a camera that provides progressive iterations.

According to another embodiment of the invention, the auto-calibration process is progressive where it is continually being updated to provide refinements, remove noise and resize the number of feature points. FIG. 18 is a flow chart diagram 60 showing an updating process for the auto-calibration process. At box 62 reliable feature points are selected based on their cornerness values and correspondence errors in image. At box 64, the selected feature points pass their three directional positions to the additional detected features in the image at box 66 at a next iteration. The accumulated points are provided at box 68. A correspondence of the newly detected feature points is then provided at box 72 from the next image at box 70. The auto-calibration process is provided at box 74 that provides updated feature points in three dimensional space at box 76. Ground plane model checking is then performed at box 78 and the ground plane is updated at box 80. New features, which fit the current ground plane model, are detected at box 82 and new feature points are identified at box 84.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for calibrating a camera that is moving relative to the ground, said method comprising:
   identifying at least two feature points in at least two camera images;
   determining a camera translation and rotation between camera coordinates for different positions of the camera at a first position of the camera;
   defining a ground plane in camera coordinates;
   determining a height of the camera above the ground, wherein determining the camera height includes calculating an inner product between a mean of the featured points and a norm of the ground plane; and
   identifying a rotation of the camera in vehicle coordinates.

2. The method according to claim 1 wherein determining a camera translation and rotation includes identifying a location point of the camera in the at least two images relative to a normalized image plane, identifying a three-dimensional space using the camera location point for the two images of the camera and one of the feature points and determining a camera translation direction between the two images using the three-dimensional space.

3. The method according to claim 2 wherein the translation direction is calculated where the distance between the locations where the two images are taken is known.

4. The method according to claim 2 wherein the translation direction is estimated where the distance between the locations where the two images are taken is unknown.

5. The method according to claim 2 wherein defining a ground plane includes defining a ground plane in camera coordinates based on the at least two feature points and the camera translation direction.

6. The method according to claim 5 wherein defining the ground plane includes using the translation direction, the two points on the ground to determine a mean for the points on the ground, a dominant variation direction of the ground points and a ground norm direction.

7. The method according to claim 1 wherein the height of the camera is used to eliminate feature points that are not on the ground.

8. The method according to claim 1 wherein determining the camera rotation in vehicle coordinates includes determining the camera location in vehicle coordinates using a pitch down of the camera and a yaw of the camera.

9. The method according to claim 1 wherein identifying feature points includes identifying feature points when the vehicle is traveling in a straight line.

10. The method according to claim 1 wherein providing at least two camera images includes providing more than two camera images.

11. The method according to claim 1 wherein defining the ground plane includes merging separate ground planes for each feature point detected on the ground.

12. The method according to claim 1 wherein identifying at least two feature points includes identifying two features points for two camera images at one time frame and two feature points for two camera images at another time frame.

13. The method according to claim 12 wherein the camera is moving in a straight line during the one time frame, the camera is turning between the two time frames and the camera is moving in a straight line during the another time frame.

14. The method according to claim 1 wherein the camera is on a vehicle.

15. A method for calibrating a camera on a vehicle that is moving relative to the ground, said method comprising:
  identifying at least two feature points in at least two camera images;
  determining a camera translation and rotation between camera coordinates for different positions of the camera at a first position of the camera, wherein determining a camera translation and rotation includes identifying a location point of the camera in the at least two images relative to a normalized image plane, identifying a three-dimensional space using the camera location point for the two images of the camera and one of the feature points and determining a camera translation direction between the two images using the three-dimensional space;
  defining a ground plane in camera coordinates based on the at least two feature points and the camera translation direction, wherein defining the ground plane includes using the translation direction, the two points on the ground to determine a mean for the points on the ground, a dominant variation direction of the ground points and a ground norm direction;
  eliminating feature points that are not on the ground plane;
  determining a height of the camera above the ground by calculating an inner product between the mean of the featured points and the norm of the ground plane where the height of the camera is used to eliminate feature points that are not on the ground; and
  identifying a rotation of the camera in vehicle coordinates using a pitch down of the camera and a yaw of the camera.

16. The method according to claim 15 wherein the translation direction is calculated where the distance between the locations where the two images are taken is known.

17. The method according to claim 15 wherein the translation direction is estimated where the distance between the locations where the two images are taken is unknown.

18. The method according to claim 15 wherein defining the ground plane includes merging separate ground planes for each feature point detected on the ground.

19. The method according to claim 15 wherein identifying at least two feature points includes identifying two features points for two camera images at one time frame and two feature points for two camera images at another time frame, wherein the camera is moving in a straight line during the one time frame, the camera is turning between the two time frames and the camera is moving in a straight line during the another time frame.

20. A method for calibrating a camera on a vehicle that is moving relative to the ground, said method comprising:
  identifying at least two feature points in at least two camera images;
  determining a camera translation and rotation between camera coordinates for different positions of the camera at a first position of the camera, wherein determining a camera translation and rotation includes identifying a location point of the camera in the at least two images relative to a normalized image plane, identifying a three-dimensional space using the camera location point for the two images of the camera and one of the feature points and determining a camera translation direction between the two images using the three-dimensional space;
  defining a ground plane in camera coordinates based on the at least two feature points and the camera translation direction;
  determining a height of the camera above the ground by calculating an inner product between a mean of the featured points and a norm of the ground plane; and
  identifying a rotation of the camera in vehicle coordinates.

* * * * *